J. MAXWELL.

Apparatus for Oiling Knitting-Machine Burrs.

No. 6,106. Reissued Oct. 27, 1874.

WITNESSES

Franck L. Durand

H. A. Hall

INVENTOR

John Maxwell by Alexander & Mason his Attorneys

THE GRAPHIC CO. PHOTO-LITH. 39 & 41 PARK PLACE, N.Y.

UNITED STATES PATENT OFFICE.

JOHN MAXWELL, OF AMSTERDAM, NEW YORK.

IMPROVEMENT IN APPARATUS FOR OILING KNITTING-MACHINE BURRS.

Specification forming part of Letters Patent No. 147,672, dated February 17, 1874; reissue No. 6,106, dated October 27, 1874; application filed October 13, 1874.

*To all whom it may concern:*

Be it known that I, JOHN MAXWELL, of Amsterdam, in the county of Montgomery and State of New York, have invented certain new and useful Improvements in Oiling Knitting-Machine Burrs; and I do hereby declare that the following is a full, clear, and exact description thereof, reference being had to the accompanying drawings, and to the letters of reference marked thereon, which form a part of this specification.

The nature of my invention consists in the construction and arrangement of a lubricating device for knitting-machines and other purposes, as will be hereinafter more fully set forth.

In order to enable others skilled in the art to which my invention appertains to make and use the same I will now proceed to describe its construction and operation, referring to the annexed drawings, in which—

Figure 1:
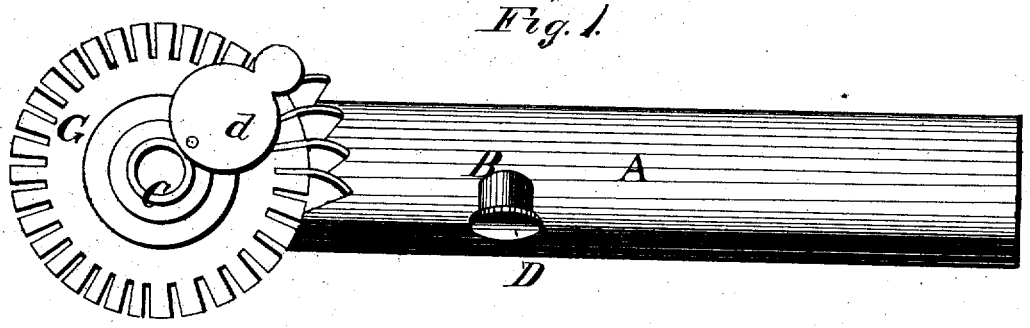
Figure 1:
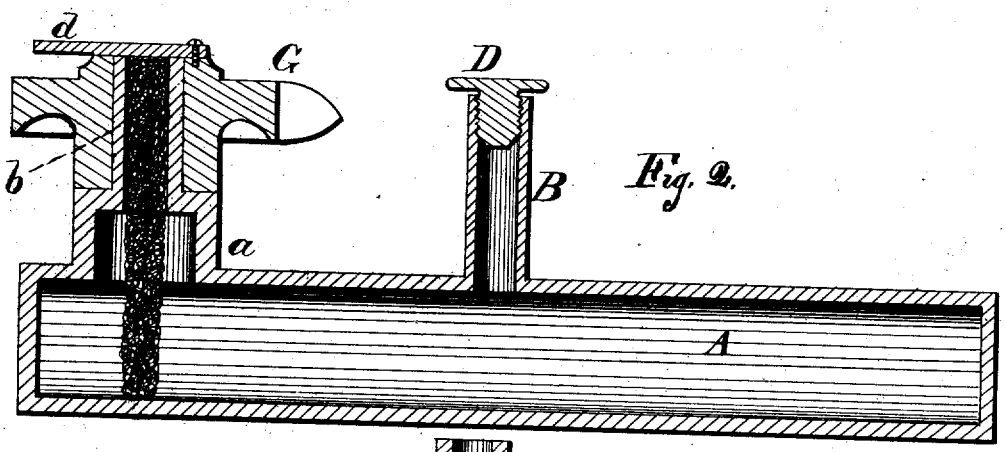
Figure 2:
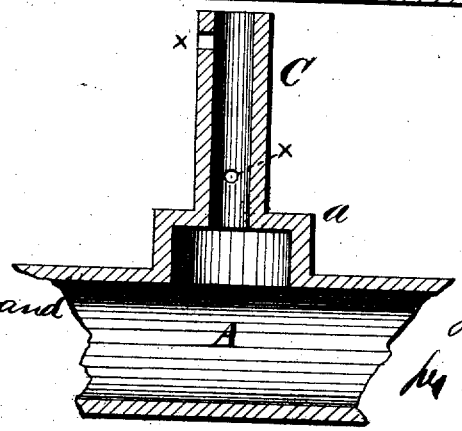

Figure 1 is a plan view, and Fig. 2 a longitudinal section, of my invention.

In the figures, A represents a hollow shaft or bar of any suitable dimensions, closed at both ends, and cast with a tube, B, on one side. It is also cast with an enlargement or hollow, *a*, into which is screwed the spindle C. The tube B may be screwed into the shaft A, instead of cast with it, and in the outer end of the tube is screwed a plug, D. The spindle C is hollow, and open at both ends, and filled with cotton or other suitable material, *b*, for conveying the oil through apertures *x x* to the outside of the spindle. G represents a knitting-machine burr, fitting over the spindle C, and provided on the outer end of its hub with a pivoted slide, *d*, which closes the outer end of the spindle. The hollow shaft or bar A forms the oil-reservoir, which is filled through the tube B, after which the screw-plug is inserted in the same.

The burr G revolving upon the spindle, the oil is drawn by capillary attraction through the wicking *b*, and passes through the apertures *x x* to the outside of the spindle, to lubricate the same, as well as the inside of the hub of the burr.

By means of the screw-plug D, the flow of oil is easily regulated, as the farther it is screwed in the more the oil is forced through the wicking.

When it is desired to clean out the interior of the spindle, it is not necessary to remove the burr, but that may remain on the spindle. The slide *d* is turned to one side, thereby giving free access to the interior of the spindle.

This mode of lubricating allows the slow and regular transmission of oil from the hollow shaft through the absorbent and small exit or exits, by capillary attraction, to the revolving mechanism adjacent thereto.

The openings *x x* are made very small, so that the oil will only flow as drawn out and needed by the revolving of the hub.

Having thus fully described my invention, what I claim as new, and desire to secure by Letters Patent, is—

1. The hollow shaft A, containing oil, and provided with an oil-inlet, B, covered by a plug, D, and a small exit or exits, *x x*, protected by an interior absorbent, *b*, to allow the slow and regular transmission of oil from the oil-shaft to the mechanism adjacent to the exit, as set forth.

2. The hollow shaft having the projection *a* and hollow perforated spindle C, in combination with the burr G, having cap *d*, substantially as and for the purposes set forth.

In testimony that I claim the foregoing I have hereunto set my hand and seal this 10th day of October, 1874.

JOHN MAXWELL. [L. S.]

Witnesses:

THOMAS S. FANCHER,
THOMAS S. STANLEY,
ZERAH S. WESTBROOK.